(12) United States Patent
Strong

(10) Patent No.: US 6,844,493 B2
(45) Date of Patent: ***Jan. 18, 2005

(54) RACEWAY FOR PROVIDING POWER AND COMMUNICATIONS CONNECTIVITY

(76) Inventor: Clinton R. Strong, 1005 Haines St., Dallas, TX (US) 75208

(*) Notice: Subject to any disclaimer, the term of this patent is extended or adjusted under 35 U.S.C. 154(b) by 0 days.

This patent is subject to a terminal disclaimer.

(21) Appl. No.: 10/441,140

(22) Filed: May 19, 2003

(65) Prior Publication Data

US 2004/0026102 A1 Feb. 12, 2004

Related U.S. Application Data

(63) Continuation of application No. 08/835,709, filed on Apr. 10, 1997, now Pat. No. 6,566,598.

(51) Int. Cl.[7] .................................................. H02G 3/04
(52) U.S. Cl. ....................................... 174/48; 174/70 C
(58) Field of Search ............................ 174/48, 70 C, 174/72 C, 117 F, 68.1; 52/220.5; 439/925, 207, 209, 211

(56) References Cited

U.S. PATENT DOCUMENTS

| | | |
|---|---|---|
| 2,391,409 A | 12/1945 | Geist et al. |
| 2,961,676 A | 12/1960 | Sneesby et al. |
| 3,029,303 A | 4/1962 | Severino |
| 3,965,967 A | 6/1976 | Jentzsch et al. |
| 4,270,833 A | 6/1981 | Storck |
| 4,404,779 A | 9/1983 | Calhoun et al. |
| 4,780,094 A | 10/1988 | Batty et al. |
| 4,826,559 A | 5/1989 | Noorily |
| 5,024,614 A | 6/1991 | Dola et al. |
| 5,263,289 A | 11/1993 | Boyd |
| 5,267,367 A | 12/1993 | Wegmann, Jr. |
| 5,777,266 A * | 7/1998 | Herman et al. ............ 174/68.1 |

* cited by examiner

Primary Examiner—Dhiru R. Patel

(57) ABSTRACT

The present invention introduces a raceway for association with a floor and a support of a structure to provide power or communications connectivity between the support and a location on the floor. The raceway includes a housing and a fastener. The housing, that is substantially equal in length to a distance between the location on the floor and the support, includes a conduit and a sloping side. The conduit is adapted to receive one or more lines from the support, the one or more lines are capable of communicating signals to the location on the floor. The sloping side, that has a length substantially equal to a length of the raceway, provides a gradual transition between the floor and the raceway and is capable of being substantially covered by a floor cover. The fastener can be associated with the housing to at least substantially ensconce the one or more lines. The fastener and the housing are capable of cooperating to integrate the raceway and the floor cover.

10 Claims, 10 Drawing Sheets

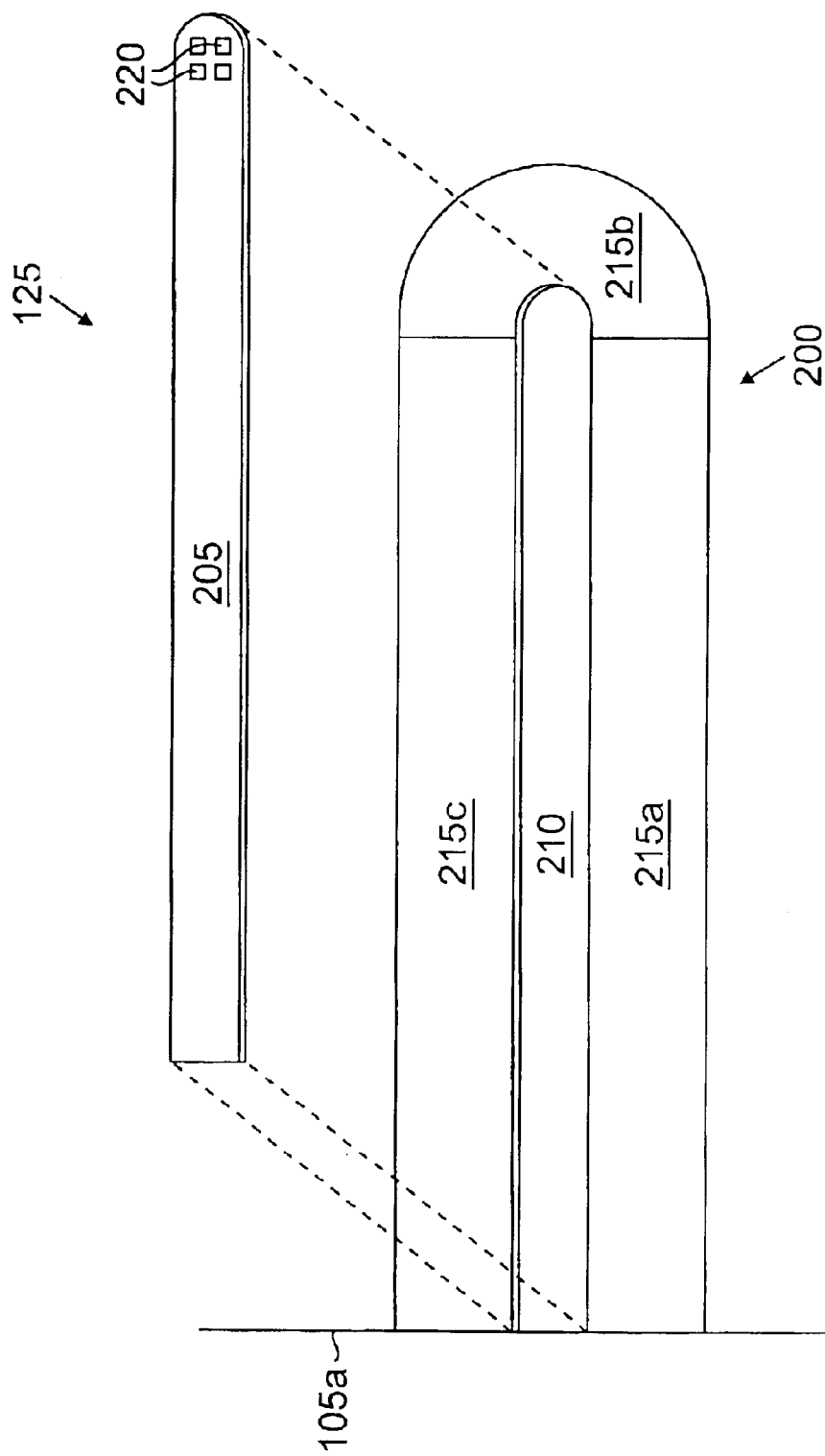

RACEWAY FOR PROVIDING POWER AND COMMUNICATIONS CONNECTIVITY

This application is a continuation of prior U.S. application Ser. No. 08/835,709 filed on Apr. 10, 1997 now U.S. Pat. No. 6,566,598.

TECHNICAL FIELD OF THE INVENTION

The present invention is directed generally to raceways having power and communications lines and, more specifically, to a raceway that is associable with a floor and a support (e.g., a wall, a column, etc.) of a structure (e.g., a room, a building, etc.) and is capable to reticulate power or communication lines proximate to a location within the structure.

BACKGROUND OF THE INVENTION

The need for connectivity, that is the ability to "plug in" to a technology available in a work place, or, now, in a home (collectively, "work space"), has never been greater. In each setting, telecommunications, television, computer, power or like systems are the norm, causing every work space to have a physical connection to power and communications lines. This may be seen in offices, office system cubicles, as well as in libraries, classrooms, training rooms, conference rooms, team work rooms and, even, corporate lobbies and lounges.

Conventional means to achieve this connectivity are several. The most basic is the traditional wall outlet for power and communications lines. This solution is limited for practical reasons to those users whose furniture is close to a wall or column having an appropriate outlet. Flexibility is of course limited by the heed for a "tether" of lines from a desk to the outlet.

An alternate approach introduces a raised floor that allows flexibility, as well as accessibility to power and communications lines. A drawback to this approach is high price, which is associated with a need for either ramps or steps to walk on the floor or a depressed floor slab (which is only an option if a structure is so designed initially) to accommodate a height of the raised floor. Another alternative, which is related to the advent of office system cubicles, introduces "power poles." A "power pole" is a low-cost method for providing power or communications connectivity through a vertical conduit that connects one or more cubicles or systems furniture to cabling above the ceiling. Although many users would prefer to avoid this awkward eyesore, power poles are economical and widely popular.

As a final example, which is situation dependent and largely based upon access, is a common technique known as the "poke through" method. This method provides cabling for power and communications lines by drilling a hole through a floor slab and passing cables through the hole. Common problems of this approach, other than its generally high cost, include potential structural limitations customary to coring through concrete floor slabs, inert penetrations that are permanent and cannot be moved as requirements change, access to the floor may be difficult when the room below the floor through which the hole is to be "poked" is occupied by a different party, and, in slab-on-grade situations (i.e., where a concrete floor slab is placed directly on the soil, with no cavity or space below) which is simply unavailable.

What is need in the art is a floor-mounted raceway that is economical and flexible, and can accommodate present and future power and communications (e.g., voice video, data, television or the like) connectivity requirements.

SUMMARY OF THE INVENTION

The present invention introduces a raceway that can be associated with a floor of a structure to provide a connectivity, such as power or communications signals, between a location on the floor and a support of the structure. Such signals may be suitably communicated (e.g., transmitted, conveyed, delivered, dispatched, broadcast, carried, relayed, etc.) via any electric, magnetic or optic means in accordance with the principles of the present invention.

A primary object of the raceway of the present invention is to provide such connectivity to the location within the structure where a need exists and where associated power or communication ports may be advantageously located. The phrase "associated with," and derivatives thereof, as used herein, may mean to include within, interconnect with, contain, be contained within, connect to or with, couple to or with, be communicable with, juxtapose, cooperate with, interleave, be integral with, intercept, be a property of, be bound to or with, have, have a property of, or the like; and the term "or," as it is used herein, is inclusive, meaning and/or.

A preferred embodiment of the raceway includes a housing and a fastener. The term "include," and derivatives thereof, as used herein, mean inclusion without limitation. The housing, which is substantially equal in length to a distance between the location on the floor and the support of the structure, comprises a conduit and at least one sloping side. The conduit is adapted to receive one or more lines from the support of the structure, the one or more lines are capable of communicating power or communications signals to the location on the floor. The at least one sloping side, which has a length substantially equal to a length of the raceway, provides a gradual transition between the floor and the raceway and is capable of being substantially covered by a floor cover.

The fastener may be associated with the housing to at least substantially ensconce the one or more lines and to integrate the raceway and the floor cover. According to an advantageous embodiment, the fastener may be colored or otherwise made in a way that draws attention to it to thereby warn of a hazard. Alternatively, the fastener may be made to blend aesthetically with the floor cover.

It should be noted that for the purposes hereof, the term "location," as it is used herein, is defined broadly, not only does it refer to a position or a place, but it may also refer to a spot, a station, a locality, a site, a location, a point, a proximity, or the like; the term "floor," as it is used herein, is also defined broadly, not only does it refer to a bottom or a surface of a structure, but it may also refer to a base, a foundation, an infrastructure, a substructure, an underpin, a subfloor, a footing, or the like; the term "structure," as it is used herein, is similarly defined broadly, not only does it refer to something built or constructed, but it may also refer to an edifice, an erection, a chamber, a building, a room, a compartment, a parlor, an office, a suite, a cell, a den, a study, a flat, a cubical, a library, a lobby, a lounge, a work space, or the like; the term "support," as it is used herein, is likewise defined broadly, not only does it refer to a means of support or a thing that supports, but it may also refer to a wall, a column, a pillar, a post, a shaft, a brace, a prop, a beam, a strut, a stud, a stay, or the like; and the term "line," as it is used herein, is likewise defined broadly, not only does it refer to a conventional or later developed means that provides connectivity for power or communications (e.g., data (including data networks, facsimile, etc.), video (including television, video telephony, etc.), voice, etc.) means between at least two points, but also any cord, queue, passage, wire, circuit, filament, cable, strand, fiber, connection, coupling, link, junction, or the like that is capable of providing such power or communications connectivity.

In an advantageous embodiment, that is described in detail hereinafter, the one or more sloping sides of the present invention provide a gradual transition from the height of the floor (which may be thought of as having a height of logical zero) to a relative top of the raceway, preferably at its highest point (possibly at the apex of the fastener, which as stated above integrates the raceway and the floor cover). Once installed, this raceway substantially reduces a likelihood that someone or something will trip over the raceway. It is important to note therefore that the height of the raceway (the height of the housing or the fastener, as measured from the floor) may vary among implementations depending upon the relative height (i.e., elevation, loft, peak, size, stature, level, rise, fullness, plushness, etc.) of the floor cover, and may, in part, be as a function of a likelihood of "tripping." The phrase "floor cover," as it is used herein, is defined broadly, not only does it refer to placing a cover on, over, to blanket or to overlay the floor to at least substantially conceal, cover or protect the same, but also any conventional or later developed carpet, tile, linoleum, padding, wood floor or like floor cover.

The foregoing outlined, rather broadly, advantageous and alternative features of the present invention so that those skilled in the art may better understand the Detailed Description of the Invention that follows. Additional features of the invention will be described hereinafter that form the subject of The Claims of the Invention. Those skilled in the art should appreciate that they can readily use the disclosed conception and specific embodiment as a basis for designing or modifying other structures or devices for carrying out the purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings wherein like numbers designate like objects, and in which:

FIG. 2 illustrates a top view diagram of an exemplary raceway embodiment that is associated with the exemplary structure of FIG. 1 according to the principles of the present invention;

DETAILED DESCRIPTION

Figure 1:
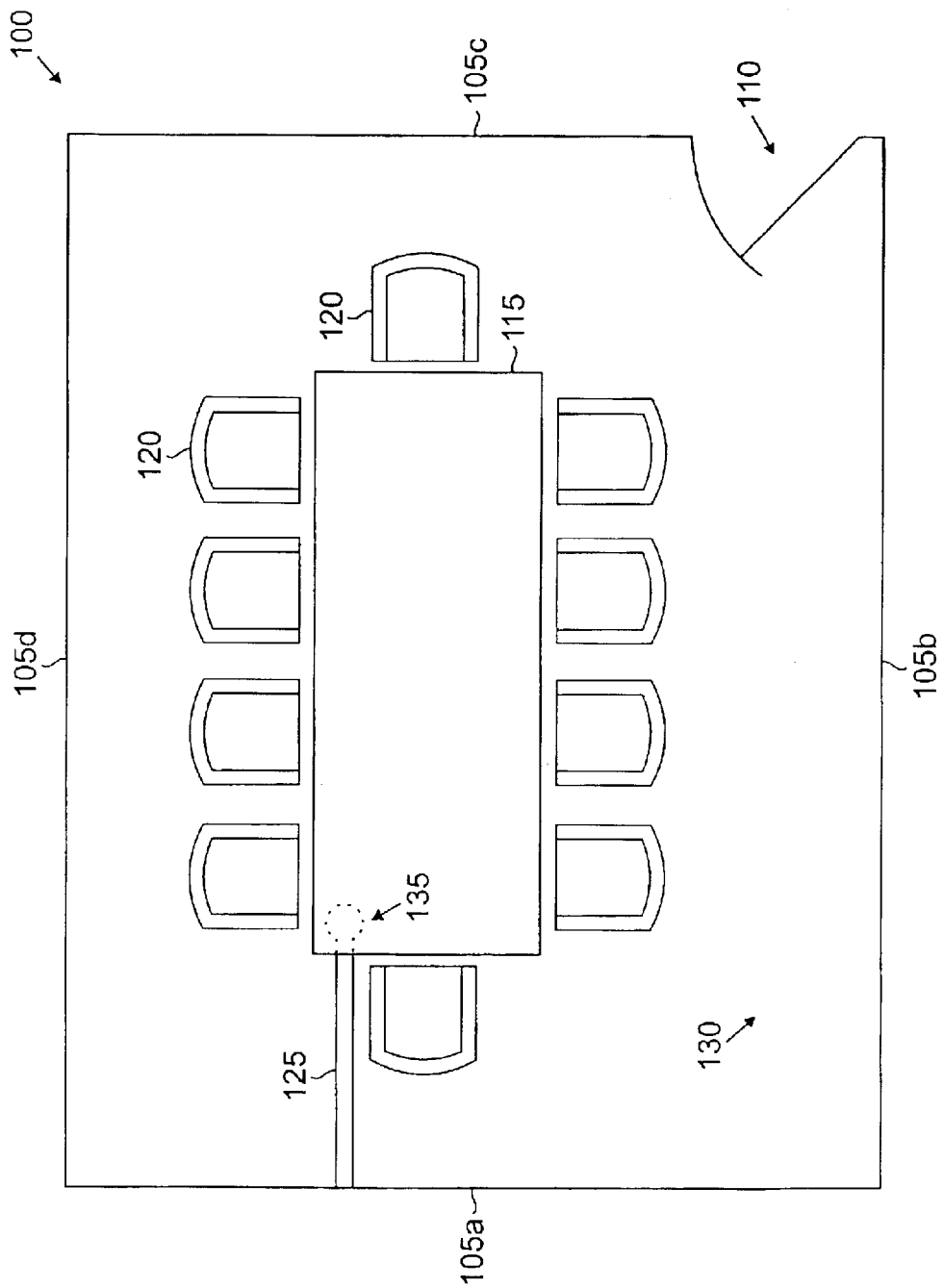
FIG. 1 illustrates a top view block diagram of an exemplary structure (e.g., a room in a building) having four supports (e.g., four walls) for the structure that includes a raceway that provides a connectivity according to the principles of the present invention.

Referring initially to FIG. 1, illustrated is a top view block diagram of an exemplary structure (generally designated 100), such as a room in a building, having four supports (four walls) 105 therefor, that illustratively includes a doorway 110, a conference table 115, a plurality of chairs 120, a raceway 125 and a floor 130—raceway 125 providing power or communications connectivity according to the principles of the present invention. Because exemplary raceway 125 is associable with any suitable structure 100, support 105, floor 130 or the like, FIG. 1 is illustrative only.

Exemplary raceway 125 may be permanently or impermanently associated with exemplary floor 130 of structure 100 to provide a connectivity between a location 135 on floor 130 and support 105a. Differentiation between permanent and impermanent may, in one context, be thought of as an association of raceway 125 with structure 105a or floor 130 wherein it (1) may not be disassociated therefrom or used again (i.e., permanent association) and (2) may be disassociated therefrom and used again (i.e., impermanent association).

Turning now to FIG. 2, illustrated is a top view diagram of raceway 125 that is associated with support 105a of structure 100 according to the principles of the present invention. For purposes of illustration, concurrent reference is made to various of the elements of FIG. 1. Raceway 125 includes a housing 200 and a fastener 205 that may be suitably associated according to the principles of the present invention. Like the relationship between raceway 125 and floor 130, housing 200 and fastener 205 may also be permanently or impermanently associated.

The term "housing," as it is used herein, is defined broadly to refer to any frame, box, casing, container, compartment, jacket, vessel, shell or the like that is suitable for containing one or more lines. Exemplary housing 200 is substantially equal in length to a distance between location 135 on floor 130 and support 105a. Housing 200 includes a conduit 210 and three sloping sides 215a to 215c.

Exemplary conduit 210 is suitably adapted to receive one or more power or communications lines from support 105a of structure 100 such that the line is capable of communicating one or more electric, magnetic, optic or other signals to location 135 on floor 130. The term "conduit," as it is used herein, is defined broadly to refer to any pipe, duct, hose, passage, channel, trough, furrow, groove, notch, tunnel, tube or the like through housing 200 that is capable of receiving or protecting one or more lines. In point of fact, one embodiment of raceway 125 is used to cover one or more lines and forms such a conduit upon the association of housing 200 and floor 130 (e.g., the one or more lines may lie on floor 130, be covered by housing 200 which is permanently or impermanently associated with floor 130).

Exemplary sloping sides 215a to 215c collectively surround conduit 210 and provide, in combination with a floor cover, a gradual transition from floor 130 at least substantially, or proximate, to a point where housing 200 and fastener 205 are associated. Note that sloping sides 215a to 215c extend substantially between location 135 on floor 130 and support 105a of structure 100. In alternate embodiments, it may be preferable to have a sloping side that does not completely surround, or form a perimeter around, housing 200, that is not substantially the length of the distance between location 135 on floor 130 and support 105a of structure 100, or that is suitably associated with housing 200 in advantageous or optimal places or positions.

Exemplary fastener 205 is illustratively and substantially equal in length to housing 200. Fastener 205 may be associated with housing 200 such that fastener 205 and housing 200 cooperate to at least substantially ensconce the one or more lines. Any such coupling of fastener 205 and housing 200 operates to integrate a floor cover with raceway 125 according to the principles of the present invention. The term "fastener," as it is used herein, is defined broadly to refer to any cap, lid, cover, stopper, plug, crown, top, plate or the like (which in some embodiments may include a device box or a portion thereof, to integrate a floor cover (e.g., carpet) with raceway 125 (shown in FIGS. 7 and 8) that may be associated with housing 200 and suitable for cooperatively containing one or more lines.

Fastener 205 illustratively includes a plurality of mates 220 that are capable of associating one or more portable devices (e.g., telephone, computer, facsimile, television, etc.) with raceway 125. The term "mate," as it is used herein, is defined broadly not only to mean any conventional or later developed means for associating a portable device with raceway 125, but may also mean an outlet, port, plug, socket, channel, passage or the like. According to the illustrated embodiment, each of mates 220 is capable of allowing communication of one or more electric, magnetic, optic or other signals between 105a and such portable devices, through raceway 125.

Generally speaking, sloping sides 215 may advantageously be designed so that a floor covering runs up and over such sides. According to the illustrated embodiment, the floor cover runs up to a trough (not shown, but illustrated hereinafter) that runs along the length of housing 200. The floor covering ends proximate to or at this trough and is suitably clamped in place when housing 200 and fastener 205 are associated. Although a trough is used, any conventional or later developed means for associating fastener 205 with housing 200 to thereby integrate the floor cover and raceway 125 may be used. Thus, the term "clamp" and derivatives thereof, as used herein, is defined broadly to include any brace, clip, clasp, grip, vise, attachment, anchor, hook, catch, glue, tack, screw, bolt, rivet, staple or the like.

An important aspect of the present invention is that raceway 125 is designed, at least in part, to integrate with the floor covering. This is accomplished by associating housing 200 with floor 130. Raceway 125 provides power or communications connectivity at or proximate to location 135 from structure 105a in an unobtrusive and safe manner (e.g., reducing trip hazard).

Figure 3A:
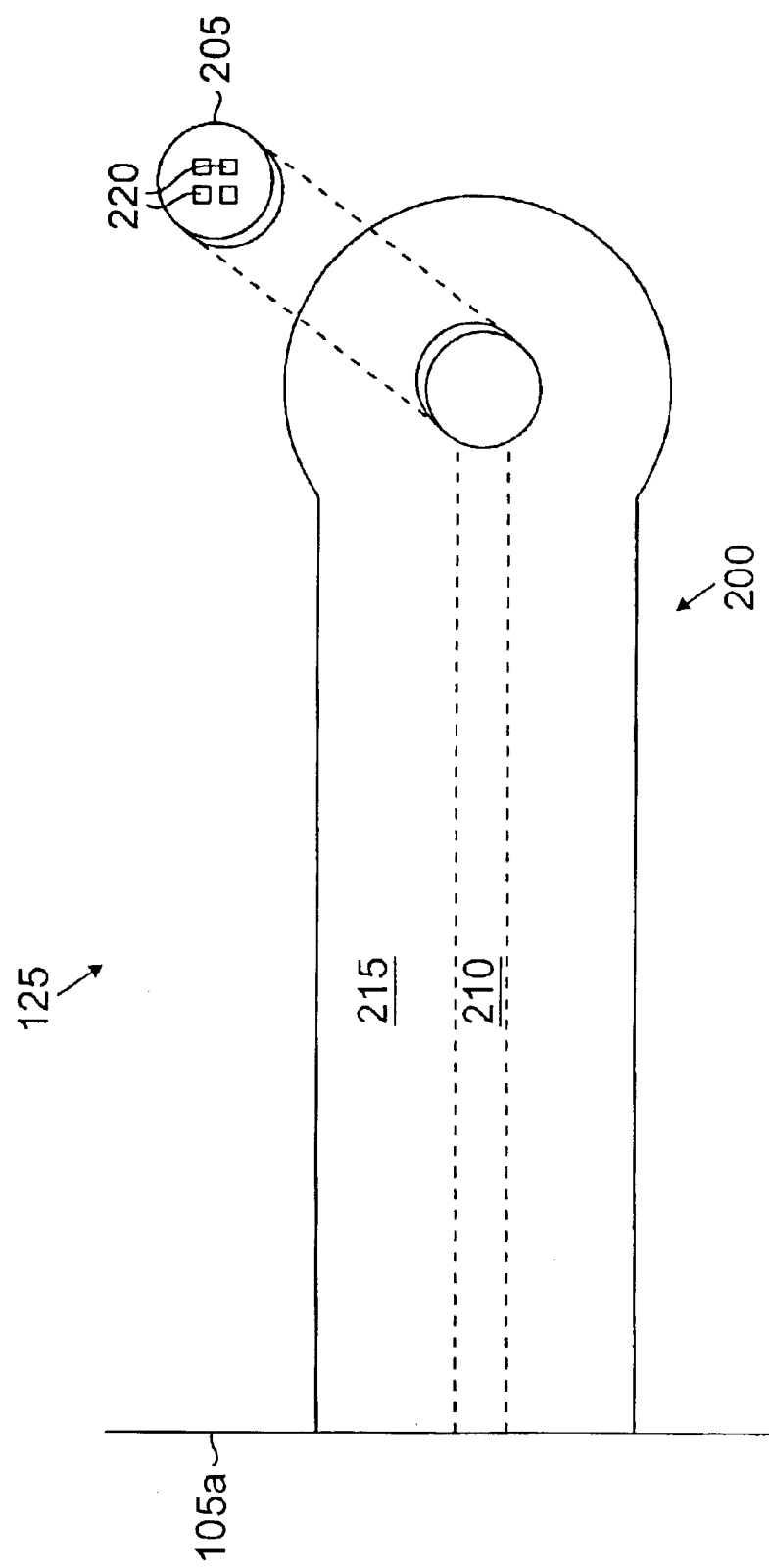
FIG. 3a illustrates a top view diagram of an alternate exemplary embodiment of the raceway of FIGS. 1 and 2 according to the principles of the present invention.

Turning to FIG. 3a, illustrated is a top view diagram of an alternate exemplary embodiment of raceway 125 of FIGS. 1 and 2 according to the principles of the present invention. For purpose of illustration, reference is concurrently made to elements of FIGS. 1 and 2.

Exemplary raceway 125 includes housing 200 and fastener 205. Housing 200 includes conduit 210 and sloping side 215. Sloping side is substantially along a length (in this case, perimeter, although may be suitably arranged per implementation or described hereinabove) of raceway 125 between location 135 on floor 130 and support 105 of structure 100. Sloping side 215 provides a gradual transition from floor 130 to a top of raceway 125. Sloping side 215, and a large part of housing 200, are capable of being at least substantially, if not completely, covered by the floor covering. In an advantageous implementation of this embodiment, housing 200 and sloping sides 215 are a single integrated piece, and housing 200 and sloping sides 215 are manufactured in sectional or modular pieces or parts to be assembled as needed for a particular project (various ways of assembling sectional or modular pieces are known and do no require further discussion). In an alternate implementation, at least some portions of housing 200 and sloping sides 215 are separate pieces. Those skilled in the art should be familiar with the use, flexibility and advantage of sectional and modular designs and further detail is unnecessary.

Fastener 205 again includes a plurality of mates 220. Note however that fastener 205 is significantly smaller than the fastener of FIG. 2. According to this embodiment, raceway 125 completely ensconces one or more lines from support 105a to a point proximate or at location 135 (e.g., a point where housing 200 and fastener may be associated may include a device box (described later)). An important aspect of this embodiment is that at least a small portion of raceway 125 may be at least, if not completely, covered by a floor covering, which may be aesthetically more pleasing, and the remaining portion of raceway 125 is capable of emerging from beneath the floor covering to provide access at location 135 to mates 220. Fastener 205 again operates to integrate raceway 125 with the floor covering.

Figure 3B:
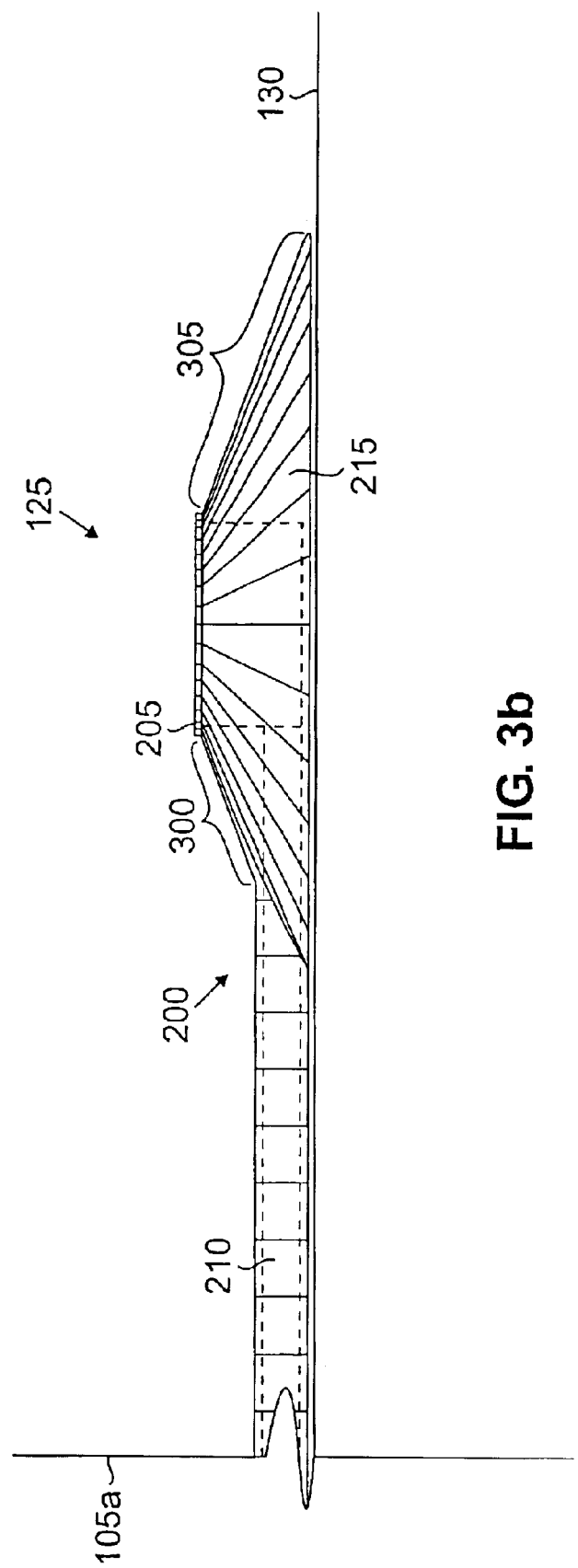
FIG. 3b illustrates a longitudinal diagram of the alternate exemplary embodiment of the raceway of FIG. 3a according to the principles of the present invention.

Turning momentarily to FIG. 3b, illustrated is a longitudinal diagram of the alternate embodiment of raceway 125 of FIG. 3a according to the principles of the present invention. According to this embodiment, sloping sides 215 illustratively maintains substantially the same transition (broadly designated 300, 305) from the association of fastener 205 and housing 200.

Those skilled in the pertinent art should understand that although raceway 125 of FIGS. 1 to 3b may illustratively appear prefabricated, mass produced/manufactured, etc., suitable alternate embodiments may, in addition to sectional or modular, be adjustable, adaptable, alterable, modifiable, variable, changeable, moldable, transformable, shapeable, convertible or the like on a per application, need, use or like implementation basis. FIGS. 2 to 3b, like FIG. 1, are illustrative only. In addition, raceway 125, and any portion thereof, may be made, manufactured, etc. from any suitable material(s), including rubber, aluminum, steel or other metal, plastic, wood or other suitable material, or some combination of two or more of the same, as other examples.

Figure 4:
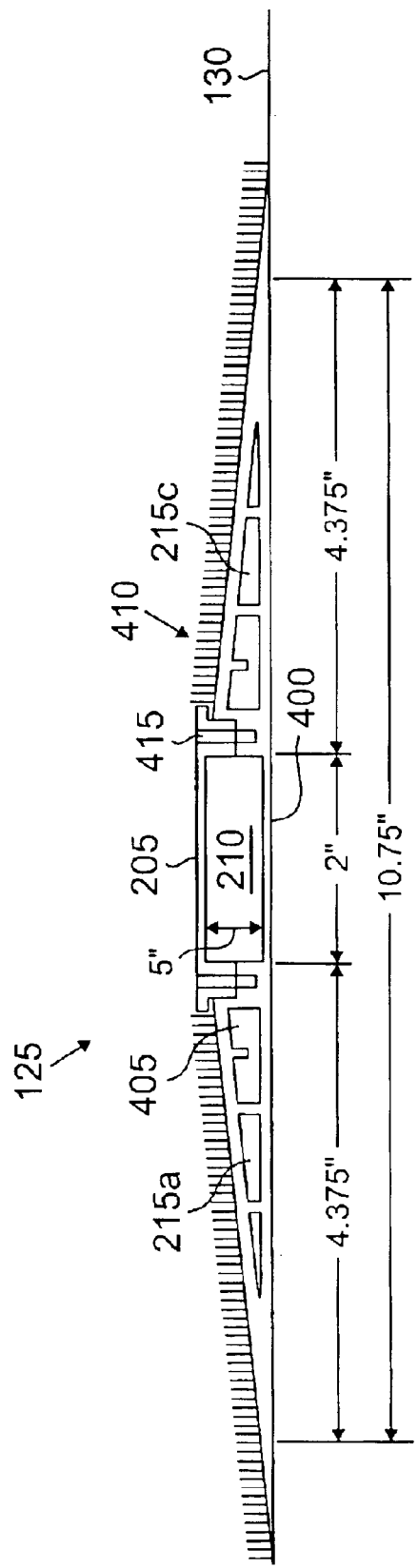
FIG. 4 illustrates a transverse sectional diagram of any of the raceways of FIGS. 1 to 3b that are associable with a floor and any of the supports of the structure of FIG. 1 according to the principles of the present invention.

Turning now to FIG. 4, illustrated is a transverse sectional diagram of raceway 125 that is associable with floor 130 and a support (not shown) of a structure and is capable to reticulate power or communication lines between location 135 on floor 130 and support 105a of structure 100. FIG. 4, like FIGS. 1 to 3b, is illustrative only. According to this embodiment, raceway 125 includes housing 200 and fastener 205.

Housing 200 illustratively comprises an aluminum base track 400 having a conduit 210 and two sloping sides 215. Exemplary base track 400 may be permanently associated with floor 130, such as glued, as illustrated, for example, or impermanently associated with floor 130, such as screwed, for another example. Thus, raceway 125 is capable of cooperating with any conventional means for associating housing 200 with floor 130, including any brace, clip, clasp, grip, vise, attachment, anchor, hook, catch, glue, tack, screw, bolt, rivet, staple or other means for associating the same, as examples. According to the present embodiment, raceway 125 further includes a screw 405 that may be used to associate pieces of base track 400 together, to associate a transition plate (illustrated below) with support 105a (not shown), to associate sloping sides 215 with housing 200, or to associate any of the above with floor 130, or otherwise, as examples.

Conduit 210 is again adapted to receive one or more lines from support 105a of structure 100 which are capable of communicating electric, magnetic, optic or other signals at least proximate to location 135 on floor 130. Sloping sides 215 again provide a gradual transition between floor 130 and raceway 125. Sloping sides 215 is substantially covered by a carpet (a floor cover 410), which may be permanently associated with sloping sides 215, such as glued, as illustrated, for example, or impermanently associated with sloping sides 215, such as tacked, as another example.

Faster illustratively coupled with housing 200 thereby substantially ensconcing the lines and integrating raceway 125 and floor cover 410. Fastener 205 may be permanently associated with housing 200, such as glued, permanently snapped, riveted, etc., for example, or impermanently associated with housing 200, such as screwed, as is illustrated (generally designated 415), clipped, otherwise snapped, etc., as other examples.

It should be noted that FIG. 4 includes a plurality of dimensions. Such dimensions are provided for the purposes of scale and general illustration. These dimensions are shown for example only.

Figure 5:
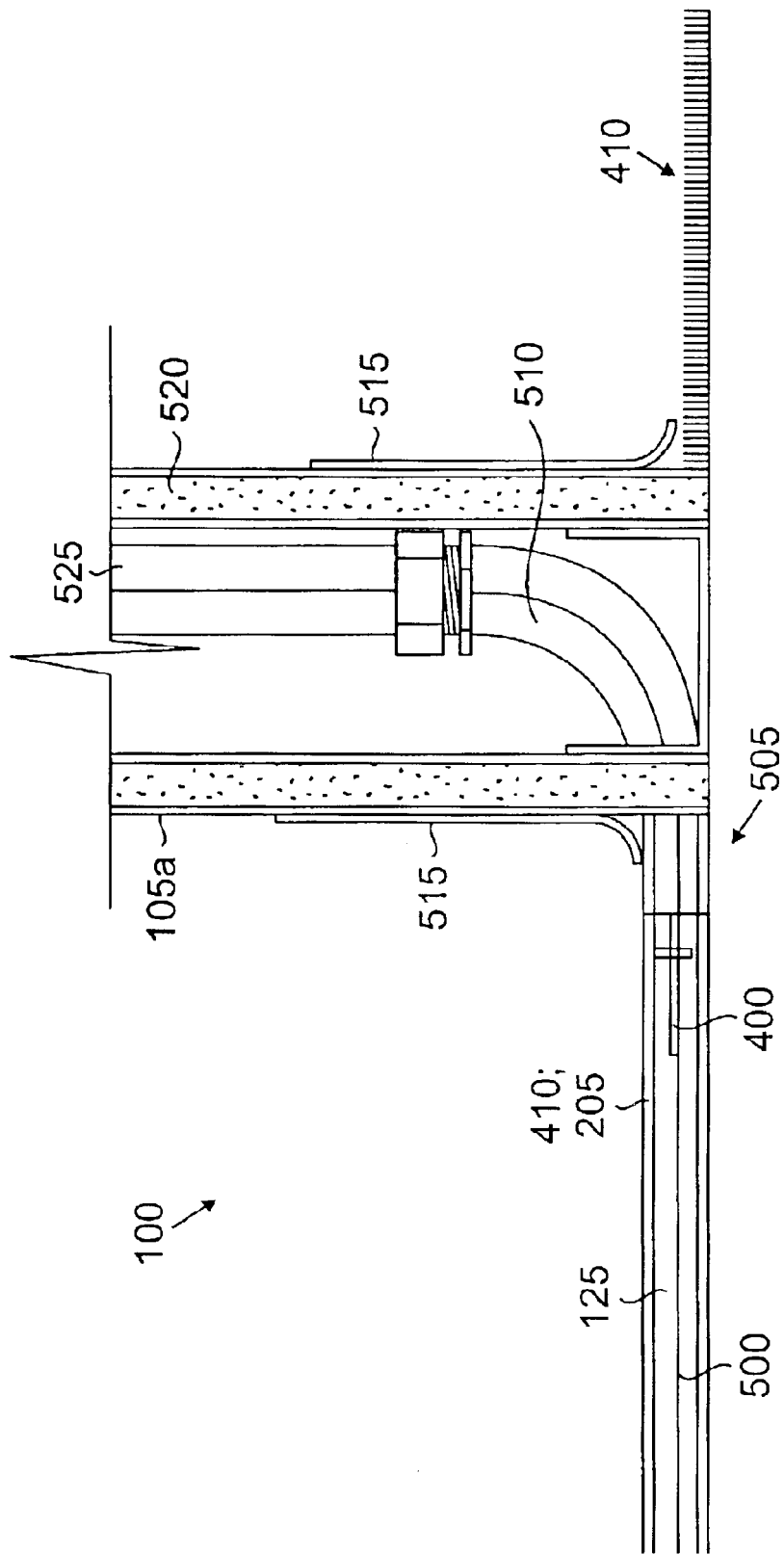
FIG. 5 illustrates a longitudinal diagram of any of the raceways of FIGS. 1 to 4 that are associable with a floor and a support of the structure of FIG. 1 according to the principles of the present invention.

Turning now to FIG. 5, illustrated is a longitudinal diagram of any of raceways 125 that can be associated with floor 130 and support 105a of structure 100 according to the principles of the present invention. FIG. 5, like FIGS. 1 to 4, is illustrative only.

Raceway 125 illustratively includes at least one line 500 and a tenon 505. Exemplary line 500 is capable of receiving electric, magnetic, optic or other signals according to the present invention. Exemplary tenon 505 is associated with base track 400, and, depending upon the embodiment, may also be associated with a transition conduit 510 to thereby associate raceway 125 and support 105a, either permanently or impermanently, according to the principles of the present invention.

It should be noted that foot moldings 515 are illustrated on both sides of support 105a, noting that foot moldings 515 are associated with floor covers 410 on both sides of support 105a. Raceway 125 is illustratively associated with a tile floor cover 410, and according to the present embodiment, fastener 205 illustratively includes the pattern of tile floor cover 410—thus once housing 200 and fastener 205 are associated, fastener 205 and tile floor cover 410 are more fully integrated and aesthetically pleasing.

Of course, as introduced above, fastener 205 can be suitably colored or otherwise appear (e.g., fluorescent, include lights or other visual or auditory warning means, etc.) to draw attention to the presence of raceway 125 to warn of a potential hazard.

Support 105a illustratively comprises a plurality of conventional metal studs (not shown) and drywall 520. Support 105a is associated with a conventional conduit 525 for lines 500, and is suitably associated with transition conduit 510. In an alternate embodiment, to keep lines 500 of different voltages separate, if desirable, two or more conduits 525 may be used. An alternate transition conduit 510 can then associate raceway 125 to these multiple conduits 525.

Figure 6:
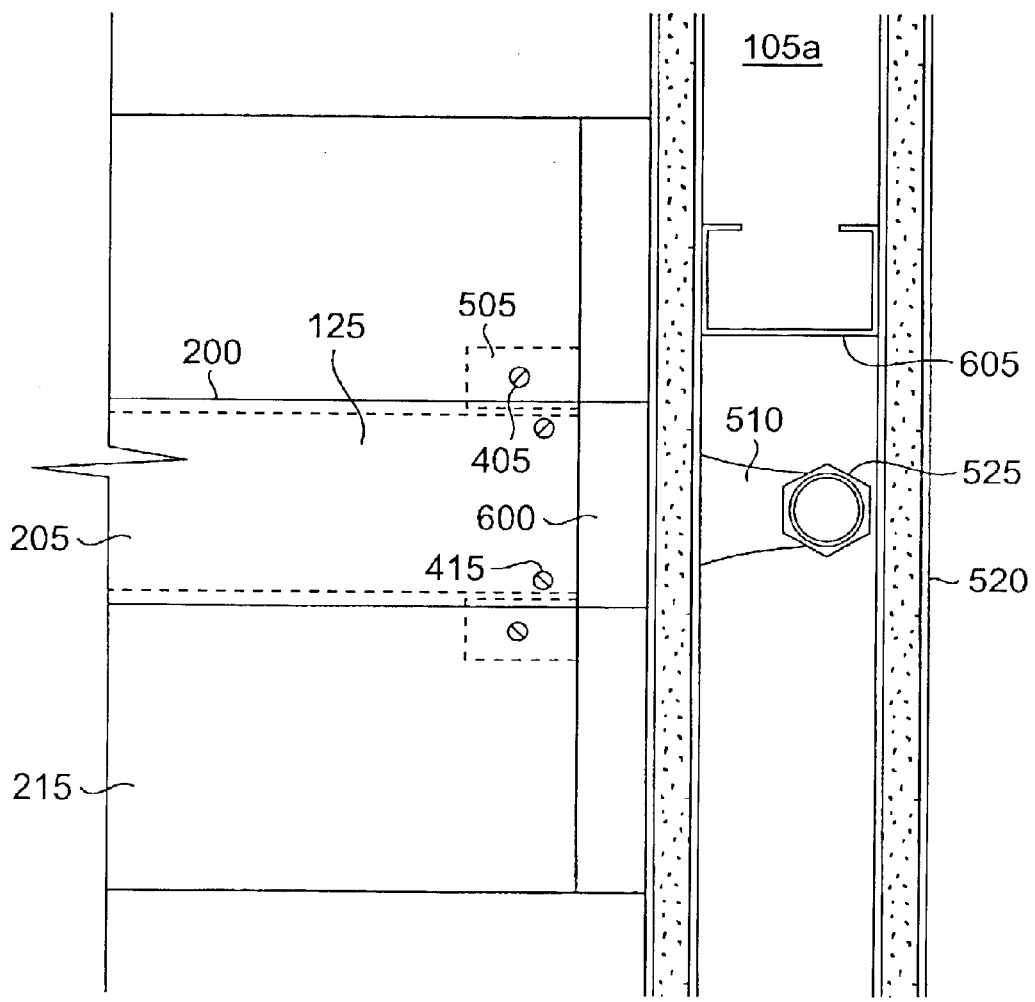
FIG. 6 illustrates a top view diagram of any of the raceways of FIGS. 1 to 5 that are associable with a floor and a support of structure of FIG. 1 according to the principles of the present invention.

Turning now to FIG. 6, illustrated in a top view diagram of any of raceways 125 that are associable with floor 130 and support 105a of structure 100 according to the principles of the present invention. FIG. 6, like FIGS. 1 to 5, is illustrative only. Raceway 125 includes an extruded housing 200, fastener 205, sloping sides 215, a sloping transition plate 600 (that is associated with sloping sides 215), screw 415, transition conduit 510, conduit 525 (that may be associated with a conventional junction box (not shown) located in support 105a or elsewhere in structure 100, such as a ceiling), a metal stud 605, drywall 520 and screw 405 through tenon 505 of transition plate 600 (to illustratively connect housing 200 to plate 600).

Figure 7:
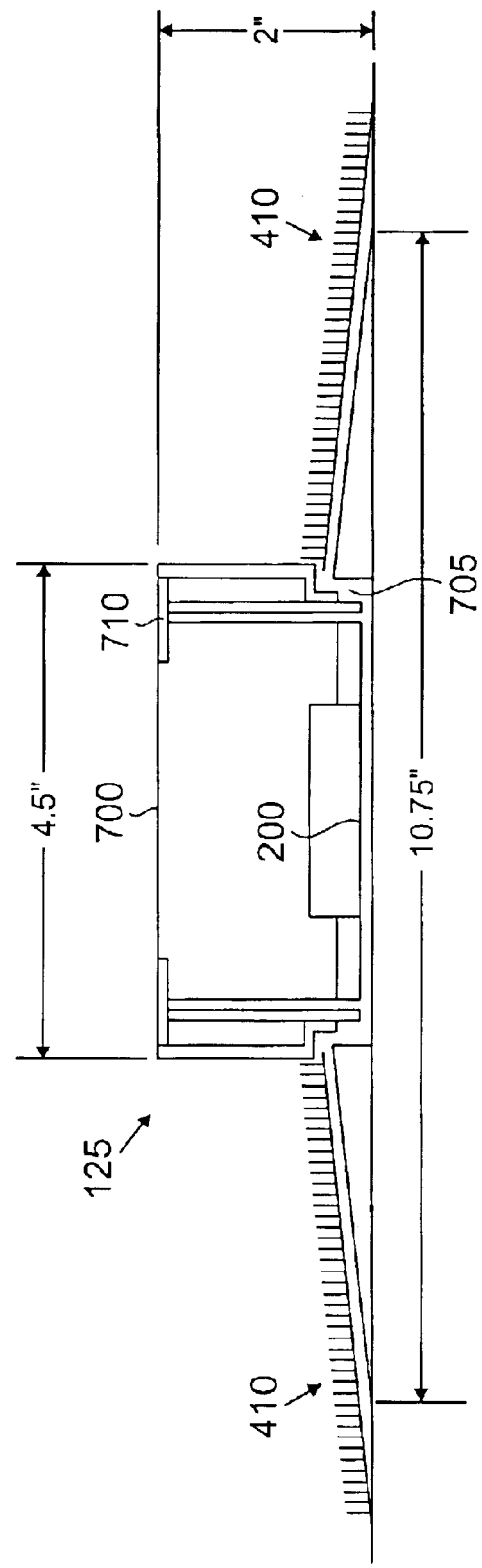
FIG. 7 illustrates a transverse sectional diagram of any of the raceways of FIGS. 1 to 6 that are associable with a floor and any of the supports of the structure of FIG. 1 according to the principles of the present invention.

Turning now to FIG. 7, illustrated is a transverse sectional diagram of raceway 125 that can be associated with floor 130 and a support (not shown) of a structure and is capable to reticulate power or communication lines through suitably arranged device box 700 between a location and support 105a of structure 100. FIG. 7, like FIGS. 1 to 6, is illustrative only. FIG. 7, like FIG. 4, includes a plurality of dimensions. Such dimensions are again provided for the purposes of scale and general illustration. These dimensions are for example only.

According to this embodiment, raceway 125 includes housing 200 (particularly base track 400), sloping sides 215 and device box 700. Device box 700 is capable of providing at least an interface to, if not all of, mates 220 which is capable of associating one or more portable devices (e.g., telephone, computer, facsimile, television, power supply, etc.) with raceway 125—each of mates 220 is capable of allowing communication of one or more communication or power signals between raceway 125 and such portable devices. Device box 700 is associated with a device box base 705 illustratively using screws 720 to clamp edges of floor cover 410 in place. Those skilled in the pertinent art are familiar with the various designs and uses of device boxes and further discussion is not necessary.

Figure 8:
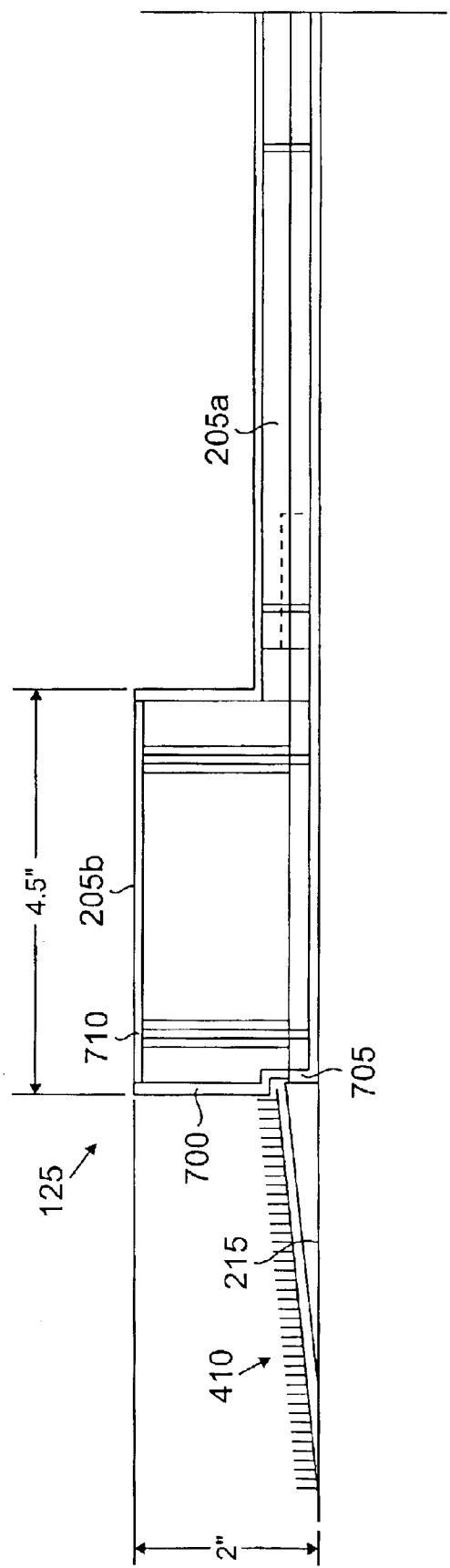
FIG. 8 illustrates a longitudinal diagram of the raceway of FIG. 7 along with the exemplary device box thereof according to the principles of the present invention.

It should be noted that the design of the present raceway 125 does not include the transition of sloping sides 215 from proximately a highest point of fastener 205 (not shown) to housing 200, as shown in FIG. 3b. Because device box 700 may have a height that is greater than another part of raceway 125, fastener 205 of raceway 125 may have separate sub-elements, which may be advantageous for a raceway similar to that illustrated in FIG. 2, or fastener 205 may be a single element, which may be advantageous for a raceway similar to that illustrated in FIG. 3. None the less, according to the illustrated embodiment and the scope of the present invention, fastener 205 includes exemplary device box 700. Fastener 205 (including device box 700) and housing 200 cooperatively integrate floor cover 410 with raceway 125. Turning now to FIG. 8, illustrated is a longitudinal diagram of raceway 125 of FIG. 7, including device box 700, according to the principles of the present invention.

FIG. 8, like FIGS. 1 to 7, is illustrative only. Raceway 125 illustratively includes housing 200, two element fastener 205a and 205b, sloping side 215 and device box 700. As in FIG. 7, device box 700 attaches to device box base 705 with screws 710, clamping edges of floor cover 410 in place. According to this embodiment, device box 700 is again illustratively included in fastener 205b according to the principles of the present invention.

Figure 9:
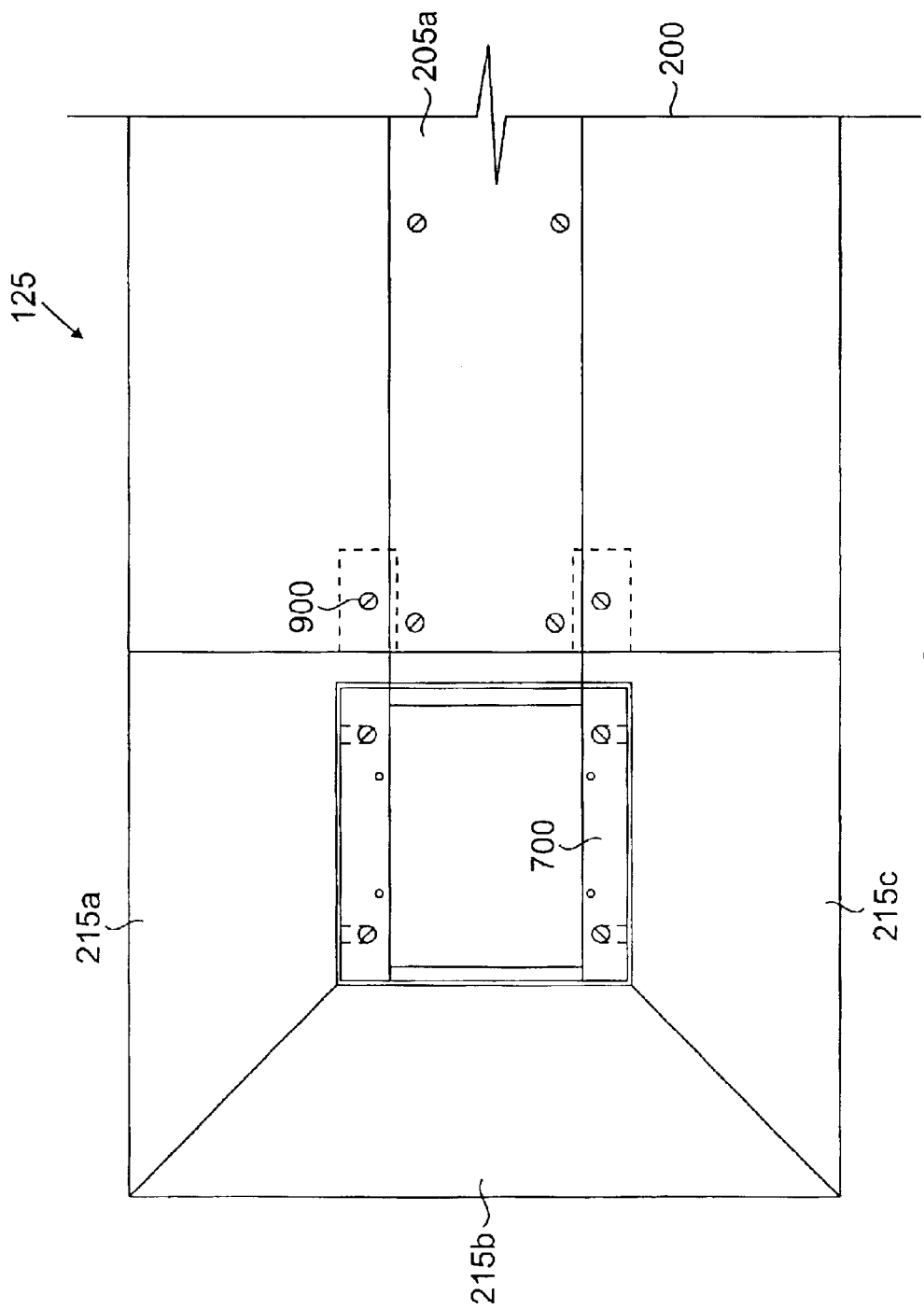
FIG. 9 illustrates a top view diagram of any of the raceways of FIGS. 7 and 8 that includes the exemplary device box of FIG. 7 according to the principles of the present invention.

Turning now to FIG. 9, illustrated is a top view diagram of raceway 125 of FIGS. 7 and 8, including device box 700, according to the principles of the present invention. FIG. 9, like FIGS. 1 to 8, is illustrative only. Raceway 125 illustratively includes housing 200, fastener 205a, sloping sides 215a to 215c, device box 700 and tenon 900. Exemplary tenon 900 attaches device box base 705 to housing 200, or alternatively is associated with floor 130 to thereby associate raceway 125 and floor 130 impermanently, although alternate embodiments may be permanent. In an alternate embodiment of present raceway 125, may suitably include the transition of sloping sides 215 from proximately a highest point of fastener 205 to housing 200, as shown in FIG. 3b.

From the above, it is apparent that the present invention introduces a raceway for association with a floor of a structure to provide a connectivity between a location on the floor and a support of the structure. The raceway comprises a housing and a fastener. The housing, that is substantially equal in length to a distance between the location on the floor and the support of the structure, comprises a conduit and a sloping side. The conduit is adapted to receive one or more lines from the support of the structure, the one or more lines are capable of communicating signals (communication or power) to the location on the floor. The sloping side, that has a length substantially equal to a length of the raceway, provides a gradual transition between the floor and the raceway and is capable of being substantially covered by a floor cover. The fastener that is couplable with the housing to at least substantially ensconce the one or more lines and to integrate the raceway and the floor cover.

Although the present invention has been described in detail, those skilled in the pertinent art should understand that they can make various changes, substitutions, modifications and alterations herein without departing from the spirit and scope of the present invention in its broadest form.

What is claimed is:

1. For association with a floor of a structure to provide at least one of power and communications connectivity between a location on said floor and a support of said structure, a raceway comprising:

a housing, substantially equal in length to a distance between said location on said floor and said support of said structure, comprising a conduit and a sloping side, said conduit being adapted to receive a line from said support of said structure, said line capable of communicating a signal to said location on said floor, and said sloping side, having a length substantially equal to a length of said raceway, provides a gradual transition between said floor and said raceway and is capable of being substantially covered by a floor cover; and a fastener associated with said housing, said fastener and said housing cooperating to at least substantially ensconce said line and to integrate said raceway and said floor cover.

2. The raceway as set forth in claim 1 wherein said fastener is substantially equal in length to said housing.

3. The raceway as set forth in claim 1 wherein said floor cover is a carpet.

4. The raceway as set forth in claim 1 further comprising clamping means for coupling said fastener with said housing to thereby integrate said floor cover and said raceway.

5. The raceway as set forth in claim 1 wherein said raceway is capable of cooperating with a means for permanently associating said housing with said floor.

6. The raceway as set forth in claim 1 further comprising means for associating said raceway with said support of said structure.

7. The raceway as set forth in claim 1 wherein said housing includes means for associating said raceway with said support.

8. The raceway as set forth in claim 1 further comprising a mate that is capable of associating a portable device with said raceway.

9. The raceway as set forth in claim 8 wherein said mate is capable of allowing communication of said signal between said raceway and said portable device.

10. The raceway as set forth in claim 1 wherein said fastener includes at least a portion of a device box.

* * * * *

UNITED STATES PATENT AND TRADEMARK OFFICE
CERTIFICATE OF CORRECTION

PATENT NO. : 6,844,493 B2
DATED : January 18, 2005
INVENTOR(S) : Clinton R. Strong It is certified that error appears in the above-identified patent and that said Letters Patent is hereby corrected as shown below:

Column 1,
Line 34, delete "heed" and replace with -- need --.

Column 6,
Line 6, insert -- 215 -- after "side".

Column 7,
Line 28, delete "Faster" and insert -- Fastener 205 is --.

Signed and Sealed this

Seventh Day of February, 2006

JON W. DUDAS
*Director of the United States Patent and Trademark Office*